Figure 1:

Sept. 30, 1958     E. GRONEMEYER     2,854,352

HIGH TEMPERATURE ADHESIVE TAPE

Filed March 31, 1954

INVENTOR.
ERICH GRONEMEYER

BY

ATTORNEY.

United States Patent Office 2,854,352
Patented Sept. 30, 1958

2,854,352

HIGH TEMPERATURE ADHESIVE TAPE

Erich Gronemeyer, Pompton Plains, N. J., assignor to Karl Huber, Newark, N. J.

Application March 31, 1954, Serial No. 419,988

1 Claim. (Cl. 117—44)

The present invention relates to a high temperature adhesive tape and more particularly to a high temperature electrical insulating tape.

In the art of high temperature tapes employed as electrically insulating coverings or coatings for electrical components, e. g. wiring, attaining substantially high temperatures during operation, the use of glass filaments has been found to possess excellent qualities. The glass filaments are employed as matted glass wool in the form of a tape, or as twisted strands woven in the form of a tape, and impregnated with an insulating bonding material such as shellac, latex, rubber, varnish, silicate of soda, rosins, etc.

Of such tapes, it has been found that the woven tape impregnated with a siliceous bonding material, such as sodium silicate, is excellent for various application purposes because the bonding material has an affinity to glass such that it imparts substantial bonding strength between the glass filaments and is less subject to deterioration by heat than other conventional bonding materials. However, there are certain disadvantages in the application of glass tapes impregnated with siliceous bonding materials. For example, one practice is to provide a strip of glass tape consisting of woven or matted glass filaments, wet the tape with a self-hardening solution of silicate of soda and, while still wet, apply the tape spirally over an electrical cable or the like. In the winding operation on the tape, although being substantially pliable, is slippery and it is quite difficult to keep the tape on the cable in a tight spiral, especially since the wet tape also renders the hands slippery. Another method is to use a glass tape already coated or impregnated with silicate of soda in hardened condition, which binds the tape filaments or fibres, and wind the tape about the cable or other electrical component. However, due to the stiffness of the prepared composite tape, there is also the difficulty of maintaining a tight spiral since the tape has the tendency to unwind itself or to slip before and during the application of the wetting agent which welds the spiral layers to each other on hardening. Furthermore, the tendency to slip upon winding renders the above mentioned tapes unsatisfactory for application over electrical components having contour variations or irregularities, e. g. electrical joints. Moreover, sodium silicate impregnated woven tapes heretofore employed have the disadvantage of becoming useless when the rolled tape becomes damp or wet during storage since the moisture welds the edges of the rolled tape thereby making it substantially impossible to unroll the tape for application.

Figure 2:
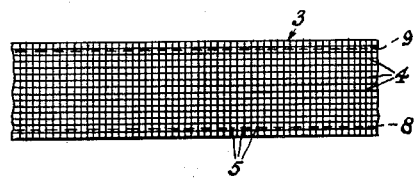
Figure 3:
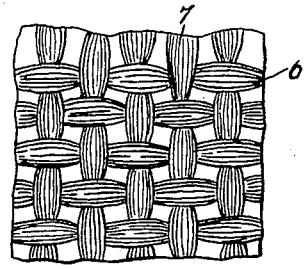
Figure 4:
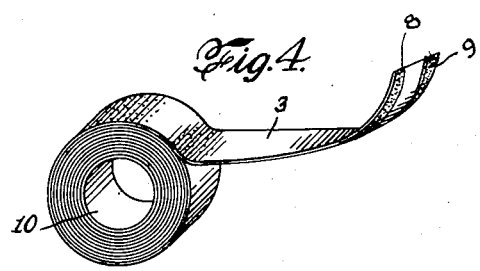

It is an object of the present invention to provide a woven glass tape impregnated with a siliceous bonding material and which precludes the disadvantages hereinabove set forth. It is another object of the present invention to provide a woven glass tape impregnated with sodium silicate and which is capable of tight winding prior to and during the application of the welding liquid. It is a further object of this invention to provide a woven glass tape impregnated with sodium silicate and which is capable of storage even under damp conditions without deleteriously affecting the tape to any great extent. It is a still further object of the present invention to provide a woven glass tape saturated with sodium silicate. Other objects and advantages of the present invention will become apparent from the description hereinafter following and the drawings forming a part hereof, in which:

Fig. 1 illustrates an elevational exaggerated view of the particular glass yarn according to the present invention, Fig. 2 illustrates an exaggerated plan view of a portion of the woven tape, Fig. 3 illustrates an enlarged exaggerated portion of the woven tape, and Fig. 4 illustrates a perspective view of the rolled tape.

The present invention concerns the provision of an insulating tape especially for high temperature purposes, although not limited for use under high temperature conditions, which comprises glass yarns composed of continuous glass filaments woven into a tape and impregnated with a siliceous bonding material, such as sodium silicate, and otherwise rendered slip-resistant and capable of tight winding about an electrical component.

The glass yarn comprising one critical feature of this invention is essentially composed of continuous glass filaments of fine diameter of the order identified as glass wool and arranged, as evidenced by Fig. 1, as a yarn 1 consisting of filaments 2 substantially parallel relationship with each other or a yarn of very little twist, e. g. less that about one twist per inch, which for the purposes herein considered may be classified as no-twist, said glass filaments being thereby rendered readily laterally displaceable with respect to each other in opposition to the conventional twisted yarns.

The yarns composed of the aforesaid particularly arranged filaments are woven in conventional manner to provide a woven glass fabric.

After weaving, the glass fabric, or strips cut therefrom in the form of tapes, in impregnated with a liquid solution of sodium silicate. Since the filaments are substantially loosely arranged with respect to each other, the impregnating process is not only a substantially rapid impregnating process, but the entire yarn bodies are substantially totally saturated with the impregnating solution. When sodium silicate is employed as the bonding agent, the wet impregnated tape or fabric may be dried and set under normal atmospheric conditions since the sodium silicate is a self-hardening agent, or the impregnant may be heated to facilitate drying and setting or a catalyst solution, such as acetone or alcohol may be employed to hasten the hardening of the impregnant.

As stated above, the yarn 1 may be totally saturated with the siliceous impregnant, however, in view of the loose nature of the filaments, the impregnant may be applied as a rapid setting paste covering a surface of the woven fabric since in the final application of the tape to an electrical component, and with the application of the solvent employed to wet the applied tape, e. g. water, the looseness of the filaments invite a rapid penetration into the fabric so as to cause substantially instantaneous solution with the impregnant thereby providing for impregnation in situ.

Fig. 2 illustrates a portion of a woven tape 3 as hereinabove stated, comprising warp yarns 4 and weft yarns 5. Although the warp and weft yarns may be somewhat contracted in the dry state before impregnation, the said yarns, in view of their no-twist properties become somewhat turgid in the wet condition, that is the wet impregnated condition after initial treatment with the impregant. For example, Fig. 3 illustrates an exaggerated turgidity of warp yarns 6 and weft yarns 7. In such condition the liquid impregnant, i. e. the impregant rendered liquid in the final application of the solvent, renders the filaments easily laterally displaceable with respect to each other since the vehicular action of the wet impregnant enhances the movement of the filaments to substantially cover the interstices between the yarns so that although the tape is woven tape and retains the tensile strength of woven tape, the coverage of the yarns is substantially of the order of matted filaments and requires no bonding of solid layers thereto for strength purposes.

Regarding Fig. 4, after the tape 3 is treated with an impregnant, i. e. a siliceous impregnant, and such impregnant is dried or set, the tape is provided with a narrow layer of pressure sensitive water-repellent adhesive along both longitudinal edges of the tape, i. e. adhesive layers 8 and 9, and preferably such adhesive layers consist of a pressure-sensitive water repellent silicone resin. After the laterally spaced longitudinal layers of pressure sensitive adhesive has been applied and set on the tape, the said tape may be conveniently rolled, as illustrated, and rendered substantially free of damage by moisture because the water repellent adhesive layers along both edges of the tape preclude the absorption of moisture into the rolled tape through the edges of the rolled tape 10.

Therefore, it is apparent that the tape so prepared consists of a tape having a longitudinally extending zone impregnated with a siliceous bonding material and outer edges provided with pressure-sensitive and water repellent adhesive layers.

In application, the prepared tape is rolled spirally over an electrical component. In view of the adhesive layers, the dry tape is tightly wound completely over the area to be covered without slippage. After applying the dry tape, the tape is then moistened with a solvent, which forms a solution, and when dried and set, welds the layers of the tape to each other. The tape, after moistening may be heat hardened or heat treated prior to the employment of the electrical component so covered.

Moreover, since the yarns are capable of lateral spreading or displacement of the filaments, the said yarns very ably cover any contour irregularity or variations in the electrical component, e. g. electrical joints and the like.

What I claim is:

An insulating tape for electrical components comprising a longitudinal strip formed of woven glass yarns, the yarn consisting of continuous filaments and having less than one twist per inch, the strip being impregnated with sodium silicate, and narrow layers of pressure-sensitive silicone resin adhesive on one face of the strip adjacent the outer longitudinal edges of the tape.

References Cited in the file of this patent

UNITED STATES PATENTS

| | | |
|---|---|---|
| 1,771,216 | Gossler | July 22, 1930 |
| 2,152,012 | Albion | Mar. 28, 1939 |
| 2,443,512 | Powers | June 15, 1948 |
| 2,510,120 | Leander | June 6, 1950 |
| 2,530,635 | Sowa | Nov. 21, 1950 |
| 2,718,483 | Clark | Sept. 20, 1955 |